(12) United States Patent
Fahrbach et al.

(10) Patent No.: US 11,048,078 B2
(45) Date of Patent: Jun. 29, 2021

(54) MICROSCOPE, IN PARTICULAR LIGHT SHEET MICROSCOPE OR CONFOCAL MICROSCOPE, AND RETROFIT KIT FOR A MICROSCOPE

(71) Applicant: LEICA MICROSYSTEMS CMS GMBH, Wetzlar (DE)

(72) Inventors: Florian Fahrbach, Mannheim (DE); Werner Knebel, Kronau (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 222 days.

(21) Appl. No.: 16/322,157

(22) PCT Filed: Aug. 2, 2017

(86) PCT No.: PCT/EP2017/069567
§ 371 (c)(1),
(2) Date: Apr. 25, 2019

(87) PCT Pub. No.: WO2018/024786
PCT Pub. Date: Feb. 8, 2018

(65) Prior Publication Data
US 2019/0258052 A1    Aug. 22, 2019

(30) Foreign Application Priority Data
Aug. 2, 2016    (DE) ...................... 10 2016 114 270.0

(51) Int. Cl.
*G02B 27/00*    (2006.01)
*G02B 21/00*    (2006.01)
(Continued)

(52) U.S. Cl.
CPC ..... *G02B 27/0031* (2013.01); *G01N 21/6458* (2013.01); *G02B 21/0032* (2013.01);
(Continued)

(58) Field of Classification Search
CPC ............ G02B 27/0031; G02B 27/0068; G02B 21/367; G02B 21/076; G02B 21/0032; G02B 27/037
(Continued)

(56) References Cited

U.S. PATENT DOCUMENTS

| 6,693,742 B1 | 2/2004 | Winterot et al. |
| 10,012,826 B2 | 7/2018 | Knebel et al. |

(Continued)

FOREIGN PATENT DOCUMENTS

| DE | 19951482 A1 | 5/2001 |
| DE | 102004058833 A1 | 6/2006 |

(Continued)

*Primary Examiner* — Kristina M Deherrera
(74) *Attorney, Agent, or Firm* — Leydig, Voit & Mayer, Ltd.

(57) ABSTRACT

A light sheet microscope or a confocal microscope includes illumination optics configured to transmit light of at least two wavelengths from at least one light source, along respective wavelength-dependent beam paths, from an illumination side of the illumination optics to a specimen side of the illumination optics. A lateral chromatic correction system comprising at least one optical lateral chromatic correction element is configured such that the beam paths of the at least two different wavelengths have, at a specimen-side output of the lateral chromatic correction element, an offset parallel to each other and/or are inclined relative to each other in relation to the illumination side, which, on the specimen side of the illumination optics, results in an offset of the foci of the at least two wavelengths transverse to an optical axis of the illumination optics.

15 Claims, 8 Drawing Sheets

(51) Int. Cl.
*G01N 21/64* (2006.01)
*G02B 21/36* (2006.01)

(52) U.S. Cl.
CPC ....... *G02B 21/0076* (2013.01); *G02B 21/367* (2013.01); *G02B 27/0037* (2013.01); *G02B 27/0068* (2013.01)

(58) Field of Classification Search
USPC ................................ 359/385, 637, 368, 381
See application file for complete search history.

(56) References Cited

U.S. PATENT DOCUMENTS

| | | |
|---|---|---|
| 10,132,685 B2 | 11/2018 | Shafer et al. |
| 2006/0119866 A1 | 6/2006 | Riedmann |
| 2010/0079858 A1* | 4/2010 | Suzuki ............... G02B 21/0072 359/389 |
| 2011/0062348 A1 | 3/2011 | Matthae et al. |

FOREIGN PATENT DOCUMENTS

| | | |
|---|---|---|
| DE | 102008022493 A1 | 11/2009 |
| DE | 102013213781 A | 9/2014 |
| DE | 102014116782 A1 | 5/2016 |

* cited by examiner

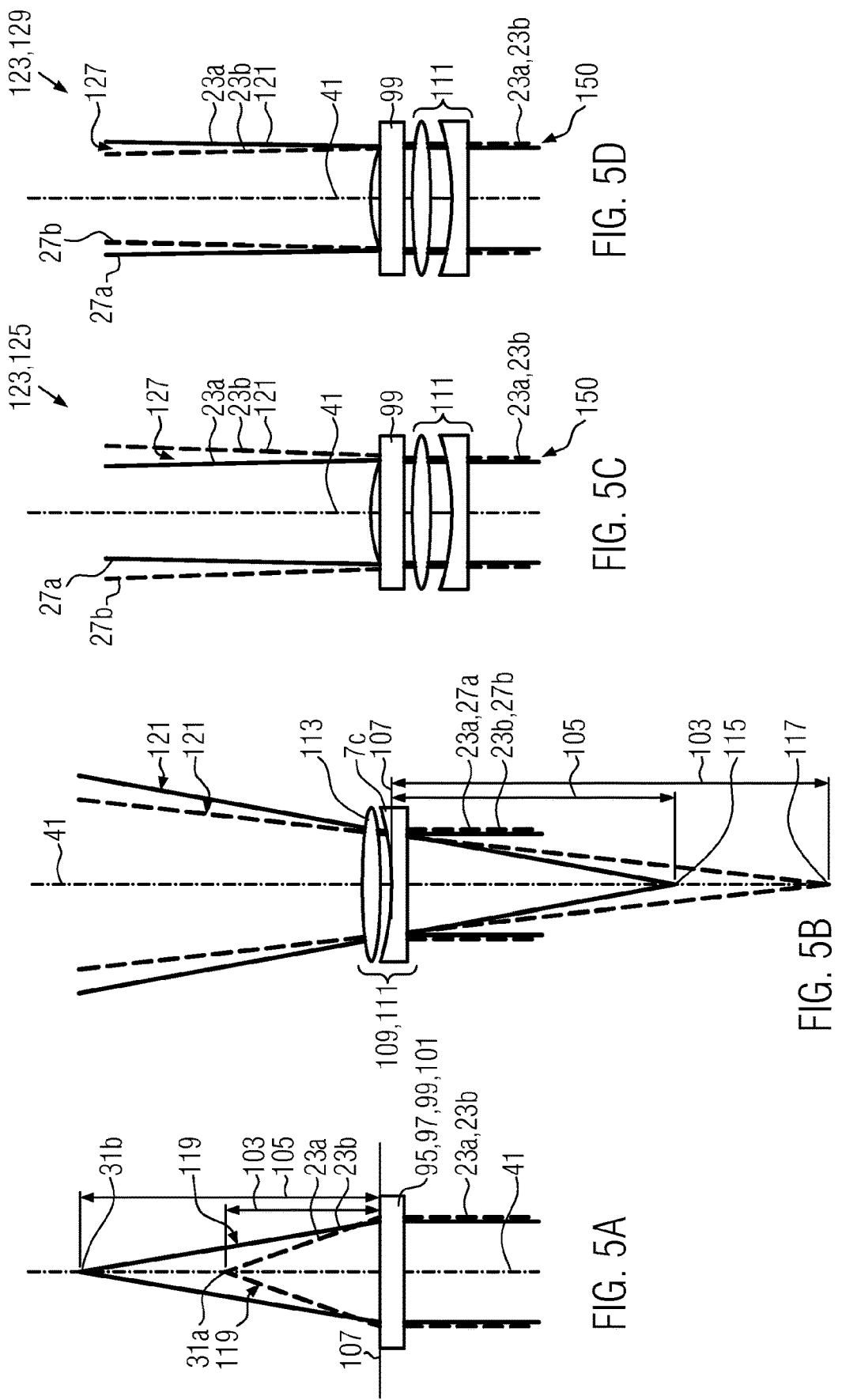

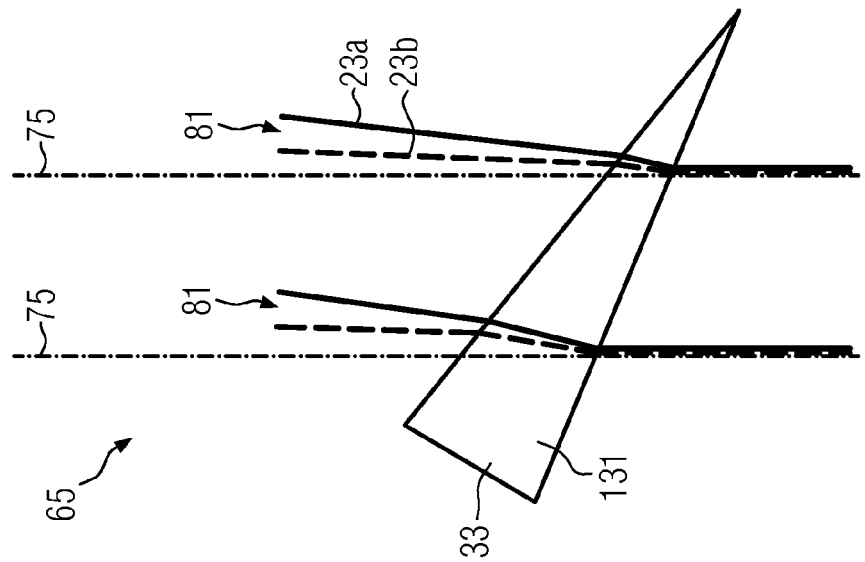
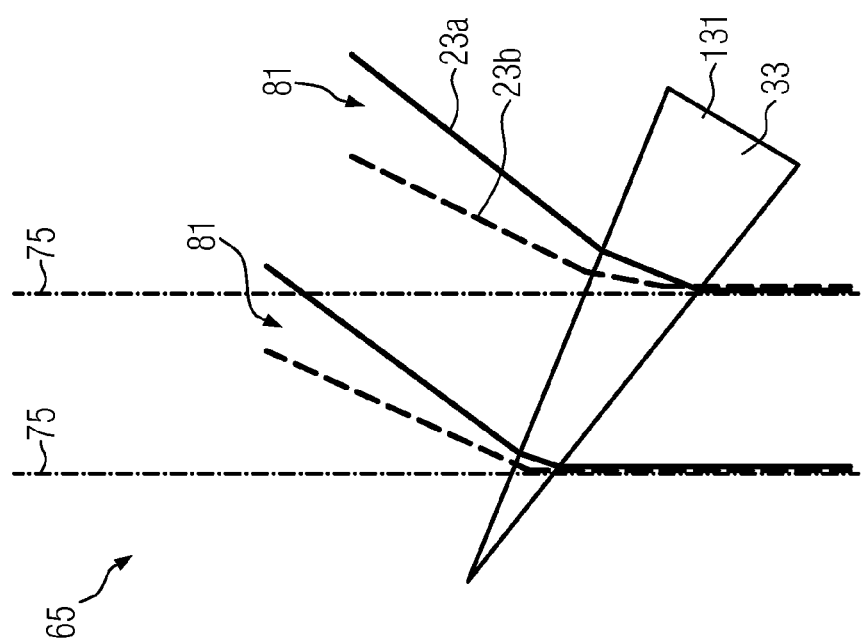

MICROSCOPE, IN PARTICULAR LIGHT SHEET MICROSCOPE OR CONFOCAL MICROSCOPE, AND RETROFIT KIT FOR A MICROSCOPE

CROSS-REFERENCE TO PRIOR APPLICATIONS

This application is a U.S. National Stage Application under 35 U.S.C. § 371 of International Application No. PCT/EP2017/069567 filed on Aug. 2, 2017, and claims benefit to German Patent Application No. DE 10 2016 114 270.0 filed on Aug. 2, 2016. The International Application was published in German on Feb. 8, 2018 as WO 2018/024786 A1 under PCT Article 21(2).

FIELD

The invention relates to a microscope—in particular, a light sheet microscope or a confocal microscope—having illumination optics for transmitting light of at least two wavelengths from at least one light source, along respective wavelength-dependent beam paths, from an illumination side of the illumination optics to a specimen side of the illumination optics. The invention further relates to an optical retrofit kit for a microscope—in particular, for a light sheet microscope or confocal microscope—having illumination optics for transmitting light of at least two wavelengths from at least one light source, along respective wavelength-dependent beam paths, from an illumination side of the illumination optics to a specimen side of the illumination optics.

BACKGROUND

Microscopes, such as a light sheet microscope or a confocal microscope, are known from the prior art. These microscopes have in common that illumination optics do not illuminate the entire specimen to be examined, but merely a limited region, which is limited in the case of a light sheet microscope in a direction along an optical axis of viewing optics. The illuminated region of a specimen examined by means of a light sheet microscope thus has an essentially two-dimensional structure. The illuminated regions in confocal microscopy are essentially zero-dimensional, and their size is on the order of magnitude of the diffraction-limited, minimum focal diameter of the illumination wavelength. These are assumed to be punctiform in the model.

An illuminated region limited at least along the optical axis of the viewing optics has the advantage that the image information of the specimen provided via the viewing optics is essentially composed of the image information of the illuminated, limited volume region of the specimen. In other words, only the pixels or the plane that are illuminated by the illumination optics contribute to image construction.

SUMMARY

In an embodiment, the present invention provides a light sheet microscope or a confocal microscope, which includes illumination optics configured to transmit light of at least two wavelengths from at least one light source, along respective wavelength-dependent beam paths, from an illumination side of the illumination optics to a specimen side of the illumination optics. A lateral chromatic correction system comprising at least one optical lateral chromatic correction element is configured such that the beam paths of the at least two different wavelengths have, at the at least two different wavelengths have, at a specimen-side output of the lateral chromatic correction element, an offset parallel to each other and/or are inclined relative to each other in relation to the illumination side, which, on the specimen side of the illumination optics, results in an offset of the foci of the at least two wavelengths transverse to an optical axis of the illumination optics.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5A a schematic illustration of the longitudinal chromatic aberration in a diffractive optical element;

FIG. 5B a schematic illustration of the longitudinal chromatic aberration in a refractive optical element comprising a tunable convex lens;

FIG. 5C a longitudinal chromatic correction system in a first correction state;

FIG. 5D the longitudinal chromatic correction system of FIG. 5C in a second correction state;

FIG. 6A a part of the lateral chromatic correction system of a third embodiment; and FIG. 6B a part of the lateral chromatic correction system of the third embodiment of FIG. 6A, with lower angular dispersion.

DETAILED DESCRIPTION

Figure 1:
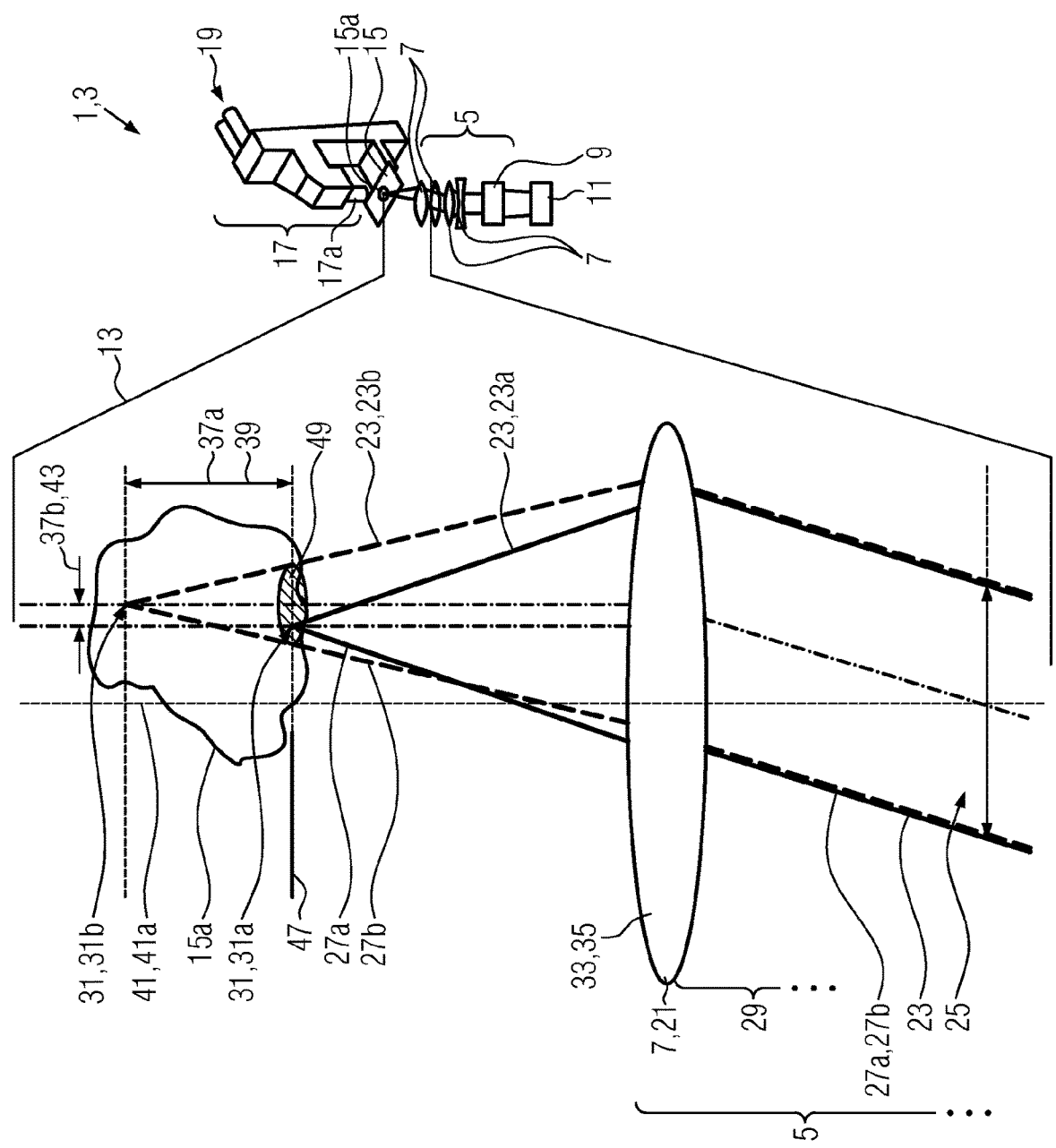
FIG. 1 a schematic illustration of the longitudinal chromatic aberration and lateral chromatic aberration in a confocal microscope.

In certain types of microscopes from the prior art, the illumination is effected by edge regions of the illumination optics. As a result, the quality of the illumination and, consequently, also the quality of the imaging of the specimen leave something to be desired.

Embodiments of the present invention provide a microscope or an optical retrofit kit which has an improved quality of illumination and an improved imaging quality. The improved qualities are, in particular, also to be achieved when the illumination is effected by edge regions of the illumination optics.

The aforementioned microscope and the aforementioned optical retrofit kit respectively achieve these improvements in that the microscope or the retrofit kit has a lateral chromatic correction system having at least one optical lateral chromatic correction element, wherein the beam paths of the at least two different wavelengths have, at the output of the lateral chromatic correction element on the specimen side, an offset parallel to each other and/or are inclined relative to each other in relation to the illumination side, causing, on the specimen side of the illumination optics, an offset of the foci of the at least two wavelengths transverse to an optical axis of the illumination optics.

An offset can be transformed into a tilting by a lens; likewise, a tilting can be transformed into an offset by a lens.

The microscope and the optical retrofit kit according to embodiments of the invention have the advantage that the offset, generated by the lateral chromatic correction system, of the foci on the specimen side of the illumination optics improves both the illumination quality and the imaging quality of the microscope. This advantage is also achieved if the illumination is effected by edge regions of the illumination optics.

It has been found that the multispectral operation of a microscope, i.e., simultaneous at several wavelengths, can lead to a chromatic imaging error (also: aberration) when using transmitting optics in the illumination optics, which error can greatly reduce the quality of the imaging of the specimen to be examined.

The dispersion of dielectric materials, i.e., their wavelength-dependent refractive index, results in coaxially-running light beams of different wavelengths being strongly refracted to different degrees upon entry (and/or exit) into the dielectric material and at an angle other than 90 degrees to the surface, which leads to chromatic aberration in the case of refractive optical elements, such as lenses.

A chromatic aberration includes a lateral chromatic aberration—the so-called transverse chromatic aberration—and an axial chromatic aberration—the so-called longitudinal chromatic aberration. Both are particularly evident in the focal point or focus of the lens.

The axial chromatic aberration brings about that the focal points of different wavelengths are offset from each other along a direction extending in parallel to the optical axis.

The lateral chromatic aberration brings about that the focal points of different wavelengths are offset from each other in a direction orthogonal to the optical axis. With coaxial entry into the lens, the foci of different wavelengths are thus at a different distance from the optical axis of the lens. This form of chromatic aberration occurs particularly when multispectral light beams penetrate an optical element obliquely or in its edge regions.

When light having at least two different wavelengths is used for specimen illumination in a confocal or light sheet microscope, this results in the different wavelengths not illuminating the same region in the specimen and reducing the illumination and imaging quality.

The lateral chromatic aberration can, in particular, significantly reduce the imaging quality in a light sheet microscope, since, in the case of illumination with two different wavelengths, two disk-shaped regions offset relative to each other along the optical axis of the viewing optics are illuminated. The viewing optics are, however, focused only on a single plane, so that the second disk-shaped illuminated plane is imaged in a blurred manner.

The microscope or the optical retrofit kit according to embodiments of the invention each counteract a reduction in the imaging quality caused by chromatic aberration.

Further advantageous embodiments of the present invention, which are advantageous in each case on their own, are described below. Technical features of the embodiments can be arbitrarily combined or omitted, unless the technical effect achieved with the omitted technical feature is of importance.

In one embodiment of the microscope according to the invention, the offset, caused by the lateral chromatic correction system on the specimen side of the illumination optics, of the foci of the at least two wavelengths transverse to the optical axis of the illumination optics is opposite the offset, caused essentially by the illumination optics, of the foci transverse, relative to each other, to the optical axis of the illumination optics. This embodiment has the advantage that the lateral chromatic aberration can be reduced or completely compensated for.

In a further embodiment, the lateral chromatic correction system can be rotated about the optical axis or about the direction of propagation. Lateral chromatic aberrations along any axis orthogonal to the optical axis can thus be compensated for.

The illumination optics can comprise several transmitting optical elements and/or elements that deflect a beam path. The illumination side of the illumination optics can have an optical input to which can be connected an optical waveguide, via which the light of a light source is transmitted. A light source can also be provided on the illumination side of the illumination optics.

As the illumination side of an element, of optics, or of a system is to be understood the side facing towards the light source. Accordingly, the specimen side of an element, of optics, or of a system is to be understood as the side facing towards the specimen to be illuminated. When viewing directions in a folded optical structure, the latter can be regarded as unfolded, so that one side of an element always points either to the specimen side or to the illumination side.

The lateral chromatic correction system can be arranged on the specimen side or on the illumination side of the illumination optics, or can be positioned in the illumination optics, i.e., for example, between two optical elements of the illumination optics.

The lateral chromatic correction system may be designed as a separate assembly installable as a unit with an illumination-side input and a specimen-side output, wherein the lateral chromatic correction system offsets and/or tilts the beam paths of the at least two different wavelengths at the specimen-side output of the lateral chromatic correction system relative to each other. The offset and/or the tilting is a relative offset and/or relative tilting of the beam paths of the at least two different wavelengths, i.e., an absolute offset and/or tilting between the beam paths of the at least two wavelengths is not generated at the specimen-side output. The relative offset and/or the relative tilting can, in certain circumstances, be applied to any already existing offset and/or tilting of the beam paths of the at least two wavelengths.

The lateral chromatic correction system can furthermore comprise lenses which make a tilting out of an offset of two beam paths relative to each other or an offset out of a tilting of two beam paths relative to each other. The offset of the beam paths of the at least two different wavelengths resulting at the specimen-side output of the lateral chromatic correction system may thus be generated by tilting the beam paths relatively to each other and by a subsequent lens.

An offset or a tilting of two beam paths relative to each other is to be understood in each case as a relative variation of the beam paths relative to each other. The microscope can furthermore have tiltable scanning elements—in particular, scanning mirrors—which can serve to deflect the beam paths of the at least two wavelengths together, wherein the relative offset or the relative tilting of the beam paths of the at least two wavelengths remains unchanged in such a deflection.

In a light sheet microscope, the scanning mirror can be used to generate a so-called virtual light sheet. One-dimensional focus regions formed in the specimen to be viewed can be moved by the scanning mirror so that the virtual light sheet is sequentially constructed in a plane orthogonal to the viewing direction of the specimen. Furthermore provided may be a system of scanning mirrors, which makes it possible to move the virtual light sheet along the viewing direction to thus generate a computer-aided, three-dimensional representation of the specimen.

The illumination optics can have a lateral chromatic aberration, so that the foci of the at least two wavelengths on the specimen side of the illumination optics are formed at a different distance from the optical axis of the illumination optics. The lateral chromatic correction system counteracts this relative offset of the foci of the at least two wavelengths. Particularly preferably, the lateral chromatic correction system counteracts the offset of the beam paths by the illumination optics in such a way that said offset is compensated for by the illumination optics. The term, "compensation," means that the foci of the at least two wavelengths are offset relative to each other by means of the lateral chromatic correction system in such a way that they are located on the specimen side of the illumination optics at an essentially equal distance from the optical axis of the illumination optics. By cascading several lateral chromatic correction systems, the lateral chromatic aberrations for more than two wavelengths can be corrected independently of one another.

The lateral chromatic correction system can be arranged, in particular, in the region of a widened beam waist, i.e., in a section of the beam path or of the beam paths with low divergence or convergence.

In one possible embodiment of the microscope according to the invention, the lateral chromatic correction system comprises a highly-dispersive, thin-film filter. This filter has the advantage that it allows a space-saving construction of the lateral chromatic correction system.

Such a filter can, for example, comprise a periodic structure of dielectric materials of different refractive indices, which may, for example, be present in the form of a so-called chirped structure (cf. chirped mirrors) or a resonator structure.

In one embodiment of the microscope, the lateral chromatic correction system may comprise at least one optical element, on the specimen side of which the beam paths of the at least two wavelengths may be tilted relative to each other in relation to the illumination side.

Such optical elements are, for example, prisms and/or gratings, wherein the angular dispersion generated by these optical elements, i.e., the angles, which depend upon the respective wavelengths, of the at least two wavelengths to each other, is transformed into an offset of the beam paths of the at least two wavelengths by an imaging optics having an odd number of optical elements.

In this embodiment, a deflection element, such as a deflection prism and/or a deflection mirror, can also be provided, by means of which the wavelengths subjected to the angular dispersion can be redirected, on average, back to the original direction of propagation.

Such a construction of an optical deflection device by means of deflection mirrors or by means of at least one deflection mirror and a deflection prism can also be used for the lateral chromatic correction system with a highly-dispersive, thin-film filter. In the case of the filter, the beam path of both wavelengths laterally offset relative to each other can thus be deflected, on average, back to the original direction of propagation.

In a further embodiment of the microscope according to the invention, at least two optical lateral chromatic correction elements are provided, of which at least one optical lateral chromatic correction element is designed to be tiltable relative to the other lateral chromatic correction element. A tiltable arrangement of at least one of the optical lateral chromatic correction elements has the advantage that the offset of the beam paths of the at least two wavelengths can be adjusted.

The at least two optical lateral chromatic correction elements can preferably be operated in transmission. Likewise, two, highly-dispersive, thin-film filters may be provided.

The lateral chromatic correction elements are preferably mounted rotatably about an axis, wherein the axis can preferably be oriented in parallel to the light sheet and/or can be orthogonal to the plane defined by the optical axis of the illumination optics and the direction of the lateral chromatic aberration.

In a further embodiment of the microscope according to the invention, at least one of the at least two optical lateral chromatic correction elements is designed as a transmitting, substantially plane-parallel plate.

Both lateral chromatic correction elements can, preferably, respectively be designed as plane-parallel transmitting plates. A substantially plane-parallel plate has the advantage that, in the case of non-perpendicular incidence of light of different wavelengths, it offsets the different spectral components relative to each other, wherein all wavelength components experience a common offset by the plane-parallel plate. The term, "substantially plane-parallel," means that the transmitting plate can have a slight wedge (a so-called wedged optical element). This has the advantage that Fabry Perot effects can be avoided. In the context of this description, an optical element having a slight wedge is still to be regarded as plane-parallel.

In a further embodiment of the microscope according to the invention, two of the at least two optical lateral chromatic correction elements are designed as transmitting, substantially plane-parallel plates, wherein the at least two plane-parallel transmitting plates have a different refractive index and/or thickness. If the two plates have different refractive indices and/or thicknesses, it is possible to compensate for the common beam offset of the beam paths of the at least two wavelengths, without, however, also compensating for the relative offset of the beam paths of the at least two wavelengths.

The two plane-parallel transmitting plates of different refractive index and/or thickness may each be oriented at different angles to the beam paths; in particular, one plate may be tilted in the mathematically positive direction (counterclockwise), and the other plate may be tilted in the mathematically negative direction (clockwise). This makes it possible to compensate for the absolute shifting of the beam paths of the at least two wavelengths relative to the original direction of propagation.

The different angles relative to the original direction of propagation generate a different angle splitting of the at least two wavelengths and, furthermore, a different offset, which is compensated for by the plane-parallel plate with the lower angle splitting and the smaller offset being designed to be thicker.

In a further embodiment of the microscope according to the invention, the at least two optical lateral chromatic correction elements have a different material dispersion.

Such an embodiment is particularly advantageous when a relatively large offset of two different wavelengths relative to each other is desired.

The material dispersion is a material parameter, by means of which the splitting of two different wavelengths or the offset of two different wavelengths can be adjusted relative to each other. Highly-dispersive materials with a low Abbe number (e.g., flint glass) can be used for the relative offset of the beam paths of the at least two wavelengths relative to each other, whereas low-dispersive materials with a high Abbe number, such as crown glass, can be used to compensate for the common beam offset of both wavelengths, without, however, completely compensating for the relative offset of the beam paths of the at least two wavelengths relative to each other.

Since, for example, crown glasses and flint glasses have a similar refractive index, two plane-parallel plates made of these two materials generate a comparable absolute offset of both different wavelengths, whereas the more highly-dispersive flint glass generates a larger relative offset of the beam paths of the at least two wavelengths relative to each other.

The relative offset of the beam paths of the at least two wavelengths relative to each other can furthermore be enlarged when the plane-parallel plate with lower dispersion is arranged at a lower angle to the original direction of propagation in the beam path and has a larger thickness than the plane-parallel plate with higher material dispersion.

In a further embodiment of the microscope according to the invention, the at least two optical lateral chromatic correction elements are coupled to one another so as to transmit motion. This has the advantage that the relative offset of the beam paths of the at least two wavelengths can be variably adjusted relative to each other, and the changed absolute offset of the beam paths to the original direction of propagation can be compensated for simultaneously by the motion-transmitting coupling of the at least two optical lateral chromatic correction elements.

The relative offset of the beam paths of the at least two wavelengths after transmission through the first optical lateral chromatic correction element is dependent upon the angle of the illumination-side lateral chromatic correction element to the original direction of propagation of the light. A larger angle results in a larger relative offset of the beam paths of the at least two wavelengths, but also in an increased absolute offset of the beam paths to the original direction of propagation. The motion-transmitting coupling of the specimen-side optical lateral chromatic correction element can be designed such that it essentially compensates for the varied absolute offset of the beam paths to the original direction of propagation.

The at least two optical lateral chromatic correction elements can be mechanically coupled, e.g., by a gear mechanism, in a motion-transmitting manner. The motion-transmitting coupling can also be effected electrically, e.g., by means of two electric motors—in particular, stepper motors.

Such a motion-transmitting coupling can also be used in the aforementioned embodiments of the microscope with a highly-dispersive, thin-film filter or an optical element tilting the beam paths of the at least two wavelengths relative to each other, such as a prism or grating.

The elements tilting the at least two wavelengths relatively to each other can be displaceable individually and/or relatively to each other along the direction of propagation. Prisms may also be displaceable along or opposite a direction of insertion, wherein the direction of insertion points from a prism base to an apex.

The lateral chromatic correction system can thus be designed as a system which can be introduced into the beam paths of the at least two wavelengths, wherein only a relative offset of the beam paths of the at least two wavelengths relative to each other, but no absolute offset of the beam paths to the original direction of propagation, occurs at the specimen-side output of the lateral chromatic correction system.

In a further embodiment of the microscope according to the invention, a longitudinal chromatic correction system is provided, wherein the beam paths of the at least two different wavelengths have a divergence or convergence relative to each other on the illumination side of the longitudinal chromatic correction system, which divergence or convergence differs from the divergence or convergence of the beam paths of the at least two wavelengths relative to each other on the specimen side of the longitudinal chromatic correction system. This has the advantage that a relative displacement of the focus positions of the at least two wavelengths relative to each other along the optical axis of the illumination optics is possible.

The displacement of the foci of the at least two wavelengths along or opposite the optical axis of the illumination optics may, for example, be used to cause both foci to overlap, so that a region defined by the overlapping foci can be illuminated simultaneously with both wavelengths.

The longitudinal chromatic correction system can, in particular, be provided in a microscope to be stand-alone, i.e., without the lateral chromatic correction system.

The illumination optics of the microscope can have a longitudinal chromatic aberration, wherein the longitudinal chromatic correction system makes it possible to additionally and specifically displace along or opposite the optical axis the displacements of the focal points of different wavelengths relative to each other occurring on the specimen side of the illumination optics as a result of the longitudinal chromatic aberration to be shifted, and to cause the focal points to overlap. Furthermore, a lateral chromatic aberration can occur on the specimen side of the illumination optics.

In particular, it may be advantageous to change the divergence or convergence of the beam paths of the at least two wavelengths by the longitudinal chromatic correction system relative to each other such that this change brings about an overlap of the focal points of the at least two wavelengths in or opposite the optical axis of the illumination optics on the specimen side of the illumination optics.

In a further embodiment of the microscope according to the invention, the longitudinal chromatic correction system has at least one refractive and at least one diffractive optical element.

Refractive optical elements can be designed, for example, as spherical lenses. Diffractive optical elements—also referred to as DOE—can be designed as essentially planar optical elements which have a microstructure. Depending upon the position on the DOE, the microstructure has different optical path lengths for transmitted light, so that partial beams passing through the DOE are phase-modulated, and constructive or destructive interference of the light is caused by the DOE.

While a spherical lens with normal dispersion has a shorter focal length for short-wave light than for long-wave light, the relationship of the focal lengths is opposite for a lens operating diffractively.

In the prior art for correcting the longitudinal chromatic aberration, in order to achieve a desired difference in the divergence or convergence of the beam paths of the at least two wavelengths with conventional lenses, a stronger divergence or convergence must generally be impressed on both colors.

With the present invention, a relative change in the convergence or divergence of the beam paths of the at least two wavelengths can be achieved, without a strong absolute divergence or convergence having to be impressed in the beam paths.

In particular, the longitudinal chromatic correction system can have an essentially identical, absolute convergence or divergence of the beam paths of the at least two wavelengths on the illumination side and the specimen side, whereas the beam paths of the at least two different wavelengths on the specimen side of the longitudinal chromatic correction system can have a relative change in divergence or convergence relative to each other.

In a further embodiment of the microscope according to the invention, the at least one refractive optical element and/or the at least one diffractive optical element has a variably-adjustable focal length. This has the advantage that both the absolute position of the foci of the beam paths of the at least two wavelengths and the relative position of the foci of the beam paths of the at least two wavelengths can be adjusted relative to each other.

Both the refractive optical element and the diffractive optical element can preferably be adjusted variably in this case. Thus, the correction of a longitudinal chromatic aberration can be possible for different combinations of two wavelengths without changing the effective focal length, i.e., for example, the position of the light sheet.

In each embodiment of the microscope according to the invention, several longitudinal chromatic correction systems can also be provided in a cascaded manner, in order to be able to compensate for the longitudinal chromatic aberration for more than two wavelengths. The cascading of longitudinal chromatic correction systems can take place, independently of a cascading of the lateral chromatic correction systems, additionally or alternatively thereto.

The refractive optical element can be a liquid-filled lens which can be changed in its focal length by means of pressure or a piezoelectric element.

The diffractive—preferably, tunable—optical element can be a diffractive, tunable lens, such as a diffractive Moiré lens, a diffractive liquid crystal lens, or an Alvarez-Lohmann lens.

In a further embodiment of the microscope according to the invention, the at least one diffractive optical element is designed as a spatial light modulator. A spatial light modulator—also called an SLM—can generate different phase-modulating microstructures repetitively, reproducibly, and with switching times in the range of a few milliseconds to 100 ms.

The spatial light modulator can be designed to be transmissive or reflective. Since a reflective spatial light modulator requires folded beam paths and a larger distance between the light modulator and the refractive optics, a transmissive spatial light modulator is, preferably, provided.

A further advantage of a spatial light modulator is that it can generally be subjected to computer-generated diffraction patterns which, for example, can easily be subjected to optimization in a computer-supported manner in order to set the desired relative displacement of the foci on the specimen side of the illumination optics. The comparatively more sluggish diffractive lens can be set to a fixed value, wherein deviations of the variable refractive lens from the desired preset value can be compensated for by the variable diffractive lens provided by the spatial light modulator.

In a further embodiment of the microscope according to the invention, the beam paths of the at least two wavelengths extend in non-paraxial edge regions of the illumination optics, wherein at least one deflection mirror deflecting the beam paths by essentially 90° is provided on the specimen side of the illumination optics. This has the advantage that the illumination optics have at least two different illumination modes.

The microscope can have viewing optics, e.g., in the form of an eyepiece, which is preferably arranged coaxially to the illumination optics. The beam paths of the illumination optics and of the viewing optics can be oriented in parallel to one another.

The illumination optics can be arranged essentially collinearly with a detection optics, so that the illumination optics can also be used paraxially or for confocal illumination. The same illumination optics can thus be used for lateral illumination of the specimen and for coaxial illumination of the specimen (transmitted-light microscopy/confocal microscopy) by using the non-paraxial edge regions of the illumination optics and of the deflection mirrors. Two deflection mirrors can, particularly preferably, be provided, which are arranged diametrically opposite the inspection region. This can allow for illumination of at least one of the two sides of the specimen or illumination of the specimen on both sides.

Particularly in the case of non-paraxial transmission of the at least two wavelengths by the illumination optics, a lateral chromatic correction can take place by means of the optical lateral chromatic correction element, wherein an additional longitudinal chromatic correction is, optionally, possible by means of the optical longitudinal chromatic correction element. The lateral chromatic aberration and the longitudinal chromatic aberration are independent of one another and overlap linearly.

In one embodiment of the microscope, the longitudinal chromatic correction system can be located both in the beam path of the paraxial and in the beam path of the non-paraxial regions of the illumination optics, so that a longitudinal chromatic correction can take place both in the case of lateral specimen illumination and in the case of coaxial specimen illumination. The optical lateral chromatic correction system can be designed such that it is located only in the beam path of the at least two wavelengths extending in the non-paraxial edge regions of the illumination optics, so that a lateral chromatic correction by means of the optical lateral chromatic correction system can take place only in the case of lateral specimen illumination.

The aforementioned scanning mirrors can deflect both the paraxial beam paths and the non-paraxial beam paths.

The optical retrofit kit for a microscope mentioned at the outset can be designed as a separate assembly, which can be installed as a unit and can be retrofitted in microscopes, in order to displace the focal position of the beam paths of the at least two different wavelengths relative to each other and transversely to the optical axis of the illumination optics when illuminating a specimen in the microscope with at least two different wavelengths.

In a further embodiment thereof, the optical retrofit kit can, in particular, be designed such that the offset, caused on the specimen side of the illumination optics by the lateral chromatic correction element, of the foci of the at least two wavelengths transverse to the optical axis of the illumination optics is opposite the offset, essentially caused by the illumination optics, of the foci transverse, relative to each other, to the optical axis of the illumination optics. Thus, it is possible to correct a lateral chromatic aberration of illumination optics of an existing microscope.

The optical retrofit kit can also be designed such that, when combining it with an existing microscope, a microscope is obtained which is identical to an embodiment of a previously described microscope according to the invention.

The optical retrofit kit can thus comprise a highly-dispersive, thin-film filter, comprise at least one optical element, on the specimen side of which the beam paths of the at least two wavelengths are tilted relative to each other in relation to the illumination side, provide at least two optical lateral chromatic correction elements, of which at least one optical lateral chromatic correction element is designed to be tiltable relative to the other lateral chromatic correction element, and provide at least one or two of the at least two optical lateral chromatic correction elements as transmitting, substantially plane-parallel plates, which can have different thicknesses or different material dispersions and/or can be coupled to one another in a motion-transmitting manner.

In a further embodiment of the optical retrofit kit according to the invention, a longitudinal chromatic correction system is provided, wherein the beam paths of the at least two different wavelengths have a divergence or convergence relative to each other on the illumination side of the longitudinal chromatic correction system, which divergence or convergence differs from the divergence or convergence of the beam paths of the at least two wavelengths relative to each other on the specimen side of the longitudinal chromatic correction system. If illumination optics of an existing microscope have a longitudinal chromatic aberration, this longitudinal chromatic aberration can be compensated for with this embodiment of the optical retrofit kit.

The optical retrofit kit can, in particular, comprise only one longitudinal chromatic correction system, so that only one longitudinal chromatic aberration of existing illumination optics can be corrected.

Like a previously mentioned embodiment of the microscope according to the invention, the longitudinal chromatic correction system of the optical retrofit kit can have at least one refractive and at least one diffractive optical element, wherein the at least one refractive optical element and/or the at least one diffractive optical element may have a variably-adjustable focal length, and wherein the at least one diffractive optical element may be designed as a spatial light modulator.

In other words, a previously described embodiment of the microscope according to the invention can be obtained by retrofitting an existing microscope with an embodiment of the optical retrofit kit.

The invention is explained in more detail below with reference to the appended drawings. The drawings show advantageous embodiments of the invention, the technical features of which may be arbitrarily combined with one another and/or omitted, unless the technical effect achieved by the omitted technical feature is of importance. The same technical features and technical features with the same function are provided with the same reference numerals for the sake of clarity.

FIG. 1 shows a schematic illustration of a microscope 1—in particular, of a confocal microscope 3—which has illumination optics 5, lenses 7, and further optical elements 9. The further optical elements 9 are symbolized by a rectangle.

The microscope 1 further comprises a light source 11, which can also be part of the illumination optics 5 in other embodiments of the microscope 1, a specimen holder 15 on which a specimen 15a can be arranged, and viewing optics 17 via which the specimen 15a illuminated by the illumination optics 5 can be viewed.

The confocal microscope 3 shown in FIG. 1 has an eyepiece 19 for viewing, wherein, in other embodiments of the confocal microscope 3, recording, processing, and displaying of the specimen 15a can preferably take place via digital image sensors and monitors.

In particular, FIG. 1 does not show the sequential image construction of confocal microscopy or an accordingly necessary raster and scanning device.

An enlargement 13 shows a refractive optical element 21 of the illumination optics 5, which element is designed as a lens 7.

Two beam paths 23 run through the lens 7, wherein the different beam paths 23 represent a short-wave beam path 23a and a long-wave beam path 23b.

The beam paths 23 are schematically illustrated with reference to marginal rays of radiation beams 25, and the short-wave beam path 23a, which is represented by a solid line, corresponds to the beam path 23 of short-wave radiation having a first wavelength 27a, which is shorter than a wavelength 27 of long-wave radiation having a second wavelength 27b. In this case, the absolute wavelength difference of the two wavelengths 27a, 27b is less relevant for the following description; only the relationship of the two wavelengths 27a, 27b is necessary for the following considerations.

Hereinafter, the terms, "short-wave light" and "long-wave light," as well as "blue" and "red" light, are used synonymously for the first wavelength 27a and the second wavelength 27b.

It can be seen in FIG. 1 that the blue light 27a and the red light 27b essentially have an identical beam path 23 on an illumination side 29 of the lens 7. The lens 7 in the embodiment of the microscope 1 shown in FIG. 1 is designed as a biconvex lens 7a and focuses the light incident on the lens 7 in a focus region 31, which is only a focal point in the case of approximation of the geometrical optics of radiation beams 25.

Due to the material dispersion 33, which represents a material parameter of the lens material 35, the blue light 27a is focused in a first focus region 31a, and the red light 27b is focused in a second focus region 31b.

Hereinafter, the terms, "blue focus region" and "red focus region," are used synonymously with the first focus region 31a and the second focus region 31b.

The lens 7, which is part of the illumination optics 5, has two, mutually-independent, linearly-overlapping chromatic aberrations 37.

A longitudinal chromatic aberration 37a—also called lateral chromatic aberration—causes a lateral offset 39 between the blue focus region 31a and the red focus region 31b along an optical axis 41 or along a direction parallel to the optical axis 41.

A lateral chromatic aberration 37b—also called transverse chromatic aberration—manifests in a transverse offset 43 of the blue focus region 31a and of the red focus region 31b relative to each other in a direction orthogonal to the optical axis 41.

In the embodiment shown, an optical axis of the viewing optics 41a also extends along the optical axis 41 shown in FIG. 1. The viewing optics 17 are set to a viewing plane 47 so that only objects located in the viewing plane 47 are sharply imaged by the viewing optics 17.

However, different regions 31a, 31b are illuminated by the blue light 27a and the red light 27b, so that the blue focus region 31a is illuminated selectively in the viewing plane 47 shown, but the red light 27b illuminates a larger light spot 49 than the blue light 27a.

Figure 2:
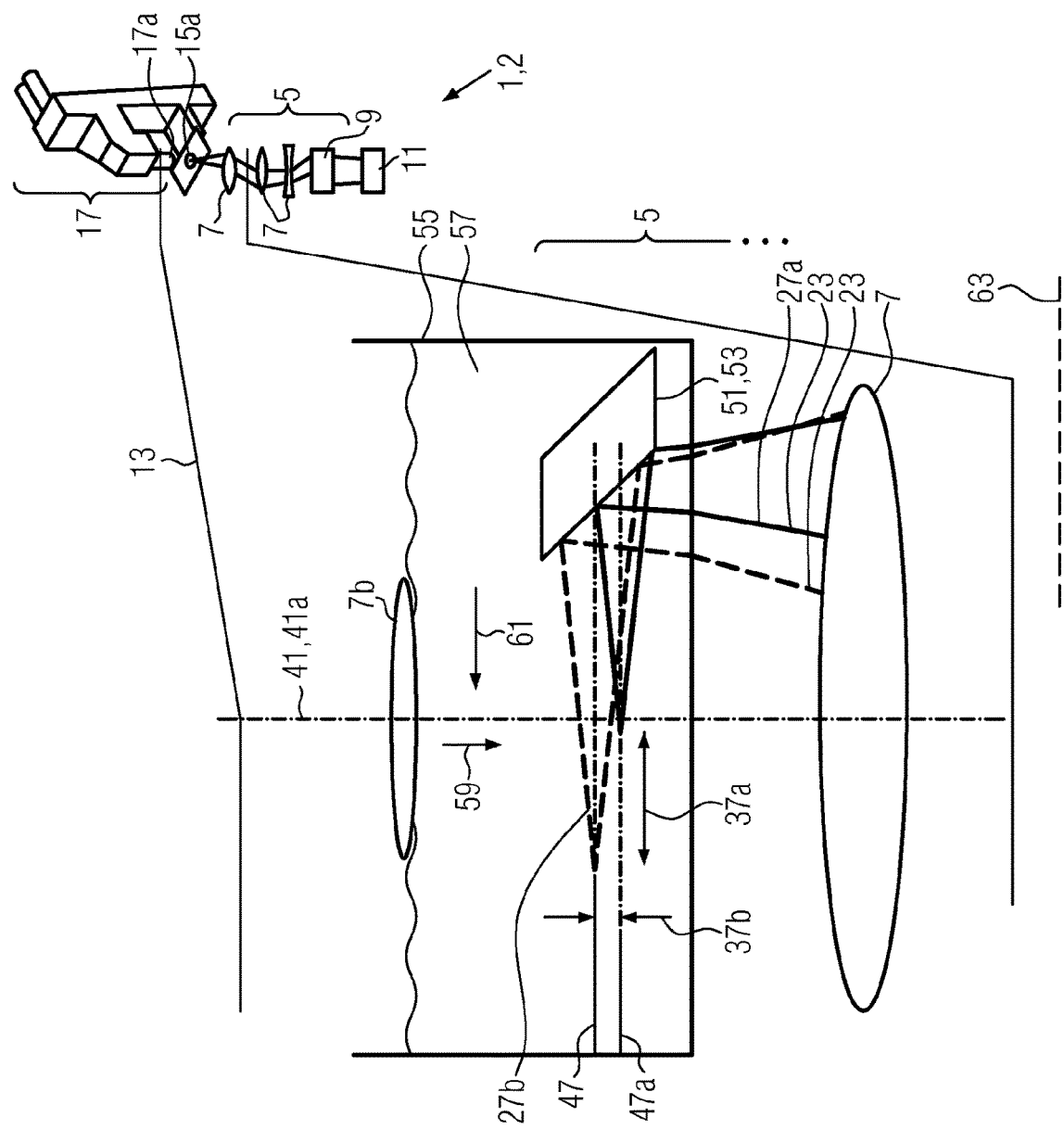
FIG. 2 a schematic illustration of the longitudinal chromatic aberration and lateral chromatic aberration in a light sheet microscope.

FIG. 2 also shows a microscope 1, wherein the microscope 1 shown is a light sheet microscope 2.

The light sheet microscope 2 also comprises illumination optics 5 and viewing optics 17. The fundamental differences in the illumination, in comparison to the confocal microscope 3 shown in FIG. 1, are shown in the enlargement 13.

The enlargement 13 shows a lens 7 and a deflection element 51 in the form of a deflection mirror 53, which are part of the illumination optics 5. The illumination optics 5 of the light sheet microscope 2 also comprise several lenses 7, further optical elements 9, and a light source 11.

The light sheet microscope 2 furthermore comprises a bowl 55 filled with immersion liquid 57, so that viewing optics 17—in particular, a microscope objective 17a with a high numerical aperture—can be used.

The light sheet microscope 2 shown in FIG. 2—in particular, its illumination optics 5—also has both a longitudinal chromatic aberration 37a and a lateral chromatic aberration 37b.

In the illustrated light sheet microscope 2, the specimen 15a is illuminated in a direction orthogonal to the optical axis 41. The optical axis 41 is, simultaneously, the optical axis of the viewing optics 41a.

FIG. 2 shows a viewing lens 7b which is located in the immersion liquid 57. The viewing lens 7b images a viewing plane 47, wherein the viewing plane 47 in the illustration shown in FIG. 2 is illuminated correctly only by the red light 27b, while the further plane 47a illuminated by the blue light 27a lies behind the viewing plane 47 in the viewing direction 59 and can thus no longer be sharply imaged by the viewing lens 7b.

The longitudinal chromatic aberration 37a in the light sheet microscope 2 results in a distribution of the intensity of the wavelengths 27, which varies along an illumination direction 61.

FIG. 2 shows only the stationary illumination in a light sheet microscope 2. The light sheet, i.e., the two-dimensional illuminated region, is constructed by tilting the beam paths 23 about a scanning axis 63 by means of a deflection element, not shown in FIG. 2 (see FIG. 4).

Figure 3A:
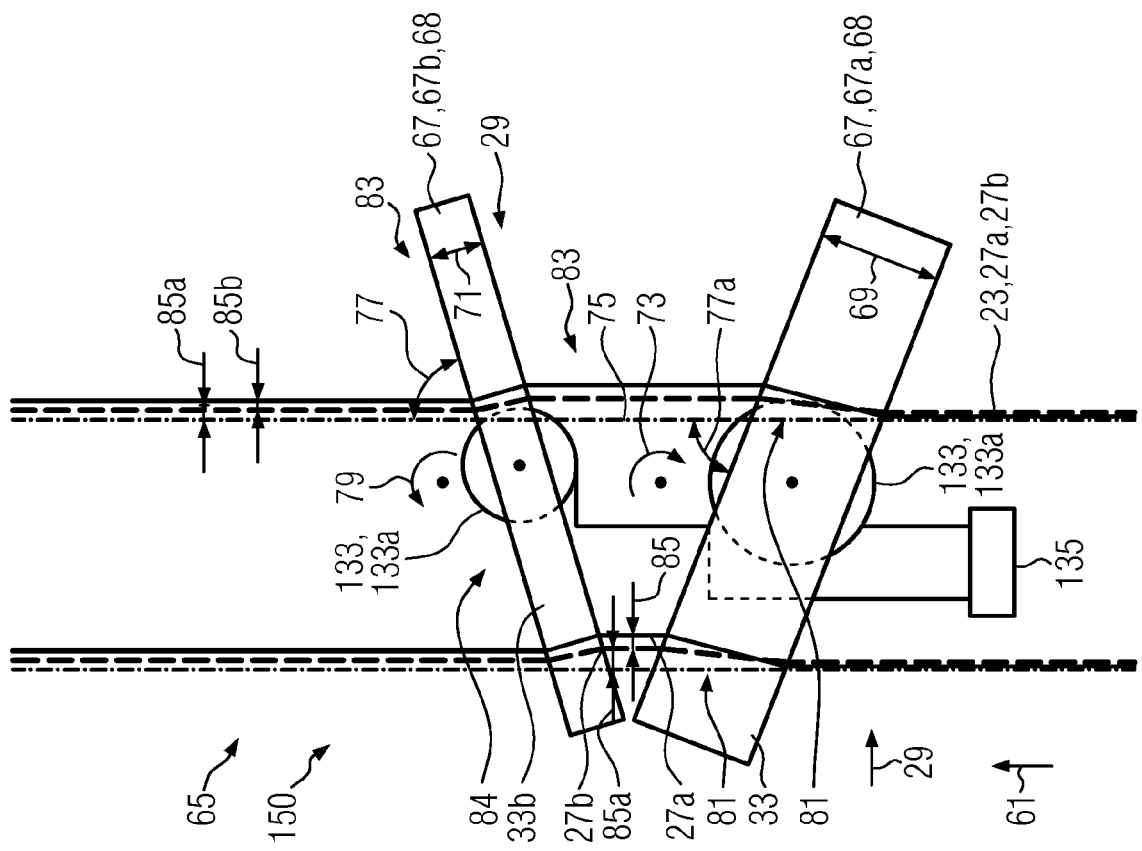
FIG. 3A a first embodiment of the lateral chromatic correction element.

FIG. 3A shows a first embodiment of a lateral chromatic correction system 65, which comprises two optical lateral chromatic correction elements 67 in the form of transmitting, substantially plane-parallel plates 68.

For the description, it is assumed that the illumination direction 61 extends as indicated in FIG. 3A. However, since optical paths are reversible, exactly the same technical effect is generated with the illustrated lateral chromatic correction system 65 when it is illuminated in the direction opposite the illumination direction 61 shown.

A first lateral chromatic correction element 67a has a thickness 69 which is greater than a thickness 71 of a second lateral chromatic correction element 67b.

The first lateral chromatic correction element 67a is, furthermore, tilted clockwise 73, opposite an original direction of propagation 75 at a first tilting angle 77a.

The second lateral chromatic correction element 67b is tilted counterclockwise 79, opposite the original direction of propagation 75 at a second tilting angle 77b.

The embodiment, shown FIG. 3A, of the lateral chromatic correction system 65 also shows that the beam paths 23 of the blue light 27a and of the red light 27b on the illumination side 29 of the lateral chromatic correction system 65 are identical, and define the original direction of propagation 75.

Due to its material dispersion 33a, the first lateral chromatic correction element 67a generates an angular dispersion 81, which, on a specimen side 81 of the first lateral chromatic correction element 67a, generates a relative offset 85 between the blue light 27a and the red light 27b.

An absolute offset 85a of both wavelengths 27a, 27b also occurs in relation to the original direction of propagation 75. A reference point for determining the absolute offset 85a is defined centrally, between the blue light 27a and the red light 27b in FIG. 3A. In FIG. 3A, the relative offset 85 is larger and not drawn to scale with respect to the absolute offset 85a. The absolute offset 85a is larger than the relative offset 85.

Since the second lateral chromatic correction element 67b is tilted counterclockwise 79, opposite the original direction of propagation 75, it causes the absolute offset 85a to be reduced or to be completely compensated for, due to the material dispersion 33b (which may differ from the material dispersion 33a). On the illumination side 29 of the second lateral chromatic correction element 67b, i.e., at a specimen-side output 84 of the second lateral chromatic correction element 67b to the specimen side 83 of the second lateral chromatic correction element 67b, only a relative offset 85b occurs.

It is particularly advantageous if the second lateral chromatic correction element 67b completely compensates for the absolute offset 85a of the first lateral chromatic correction element 67a.

On the specimen side 83 of the second lateral chromatic correction element 67b exist the relative offset 85b between the blue light 27a and the red light 27b, and an absolute offset 85a which is approximately zero.

The two lateral chromatic correction elements 67 each have a motion transmission element 133, which is connected to a synchronization unit 135. The synchronization unit 135 controls a variable rotation of the first lateral chromatic correction element 67a and synchronizes an opposite rotation of the second lateral chromatic correction element 67b. The motion transmission elements 133 are designed as stepper motors 133a.

In another embodiment of the lateral chromatic correction system 65, the synchronization can take place, for example, by means of a gear mechanism.

Figure 3B:
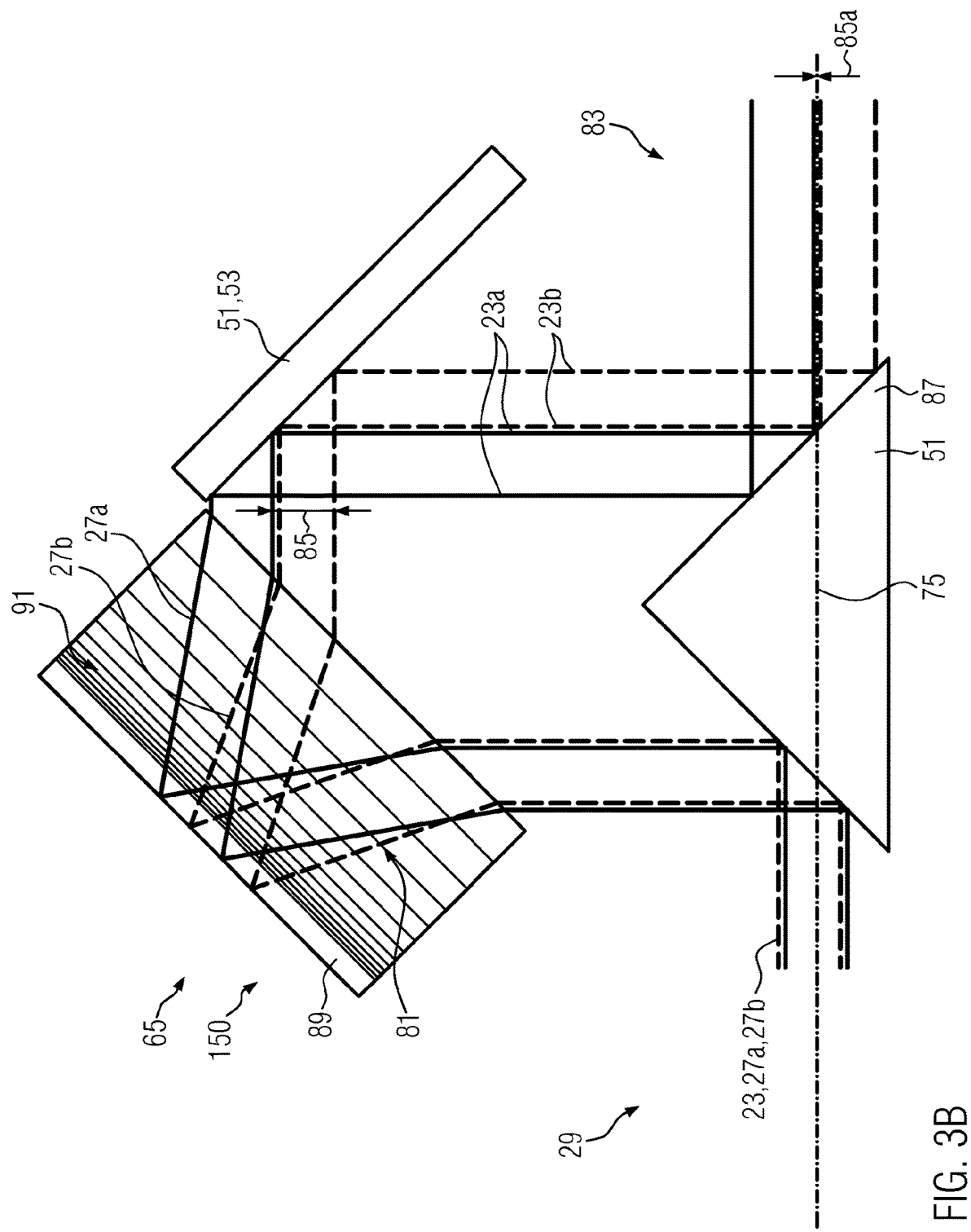
FIG. 3B a second embodiment of the lateral chromatic correction element.

FIG. 3B shows a second embodiment of the lateral chromatic correction system 65. This system comprises a deflection element 51 designed as a deflection prism 87, a highly-dispersive, thin-film filter 89, and a deflection element 51 designed as a deflection mirror 53.

On the illumination side 29 of the lateral chromatic correction system 65, the blue light 27a and the red light 27b have an identical beam path 23. The beam paths 23 of the blue light 27a and of the red light 27b are only schematically offset relative to each other.

The deflection prism 87 directs the coaxially-running beam paths 23 onto the highly-dispersive, thin-film filter 89, which generates an angular dispersion 81 which results in a relative offset 85 between the blue light 27a and the red light 27b when leaving the highly-dispersive, thin-film filter 89.

Since the highly-dispersive, thin-film filter 89 has a dispersive structure 91 (e.g., a periodic structure, chirped structure, or resonator structure), the blue light 27a is deflected less strongly in the highly-dispersive, thin-film filter 89 than the red light 27b.

By means of the deflection mirror 53, the beam paths 23a and 23b are deflected in the direction of the deflection prism 87, which outputs the two beam paths 23a, 23b essentially centrally to the original direction of propagation 75 on the specimen side 83 of the lateral chromatic correction system 65.

On the specimen side 83 of the lateral chromatic correction system 65, the absolute offset 85a is thus approximately zero, and the two beam paths 23a and 23b have only the relative offset 85b relative to each other.

Figure 3C:
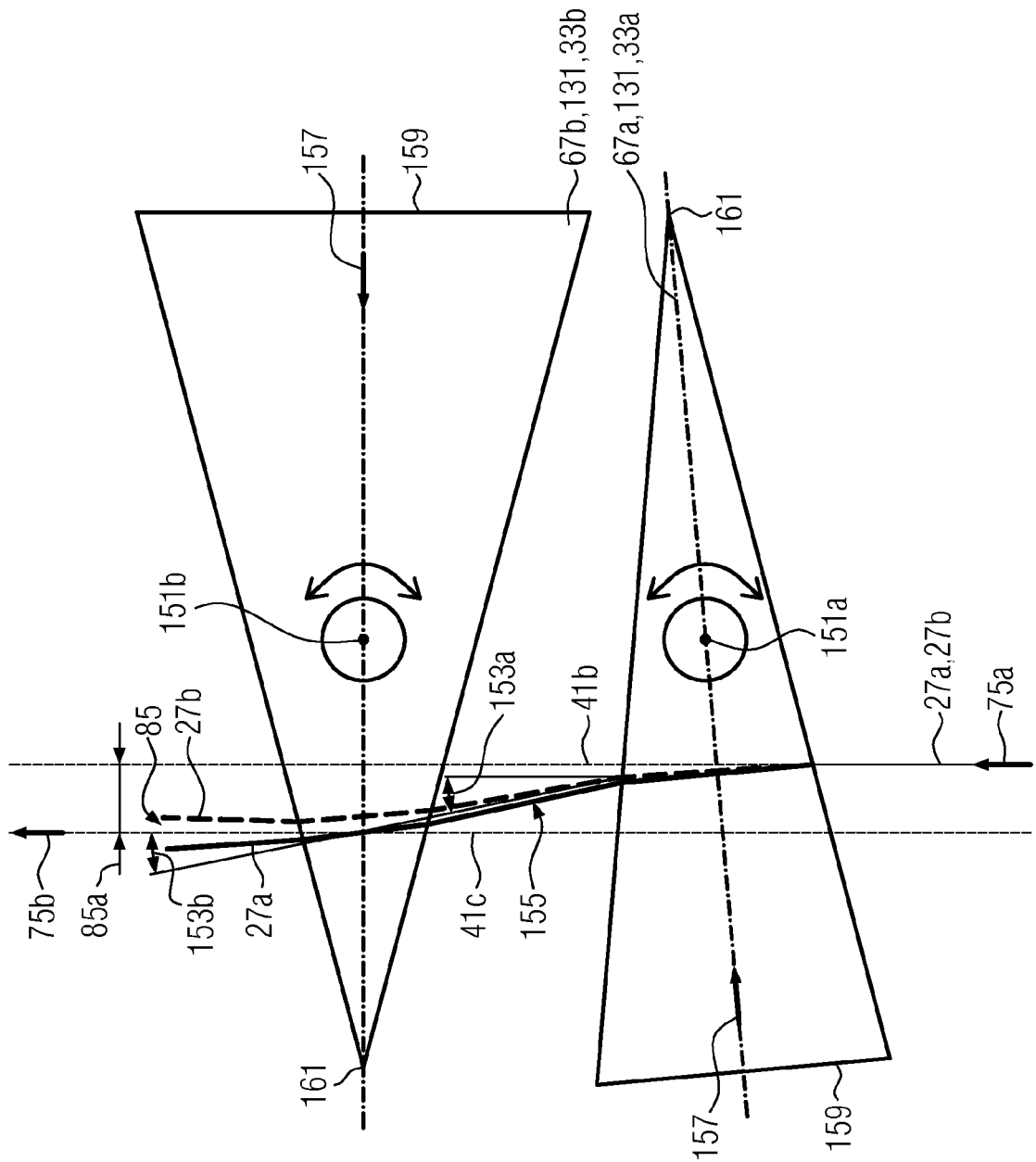
FIG. 3C a third embodiment of the lateral chromatic correction element.

FIG. 3C shows a third embodiment of the lateral chromatic correction system 65.

In this embodiment, the two lateral chromatic correction elements 67 are designed as prisms 131.

Both prisms 131 can be rotated about a respective rotational axis 151a, 151b, and/or moved along or opposite a direction of insertion 157. The direction of insertion 157 extends from a prism base 159 to an apex 161, independently of the rotation of the prism 131. The two prisms 131 can have different directions of insertion 157.

The first lateral chromatic correction element 67a and the second lateral chromatic correction element 67b have different material dispersions 33a, 33b. Preferably, the material dispersion 33a is greater than the material dispersion 33b. The prism 131 with high material dispersion 33a deflects the first wavelength 27a and the second wavelength 27b by a first mean deflection angle 153a. Between the first wavelength 27a and the second wavelength 27b, there forms a relative splitting 155 due to the first material dispersion 33a.

The prism 131 of smaller material dispersion 33b deflects both the first wavelength 27a and the second wavelength 27b by a second mean deflection angle 153b, wherein this deflection preferably compensates for the deflection by the first mean deflection angle 153a so that a resulting second direction of propagation 75b is displaced only laterally in parallel to a first direction of propagation 75a, but is oriented essentially in parallel thereto. Optical axes 41b, 41c are also offset in parallel.

After transmission of the first wavelength 27a and the second wavelength 27b through the prisms 131, they have the relative offset 85 relative to each other, and both together have the absolute offset 85a to the first direction of propagation 75a.

Figure 4:
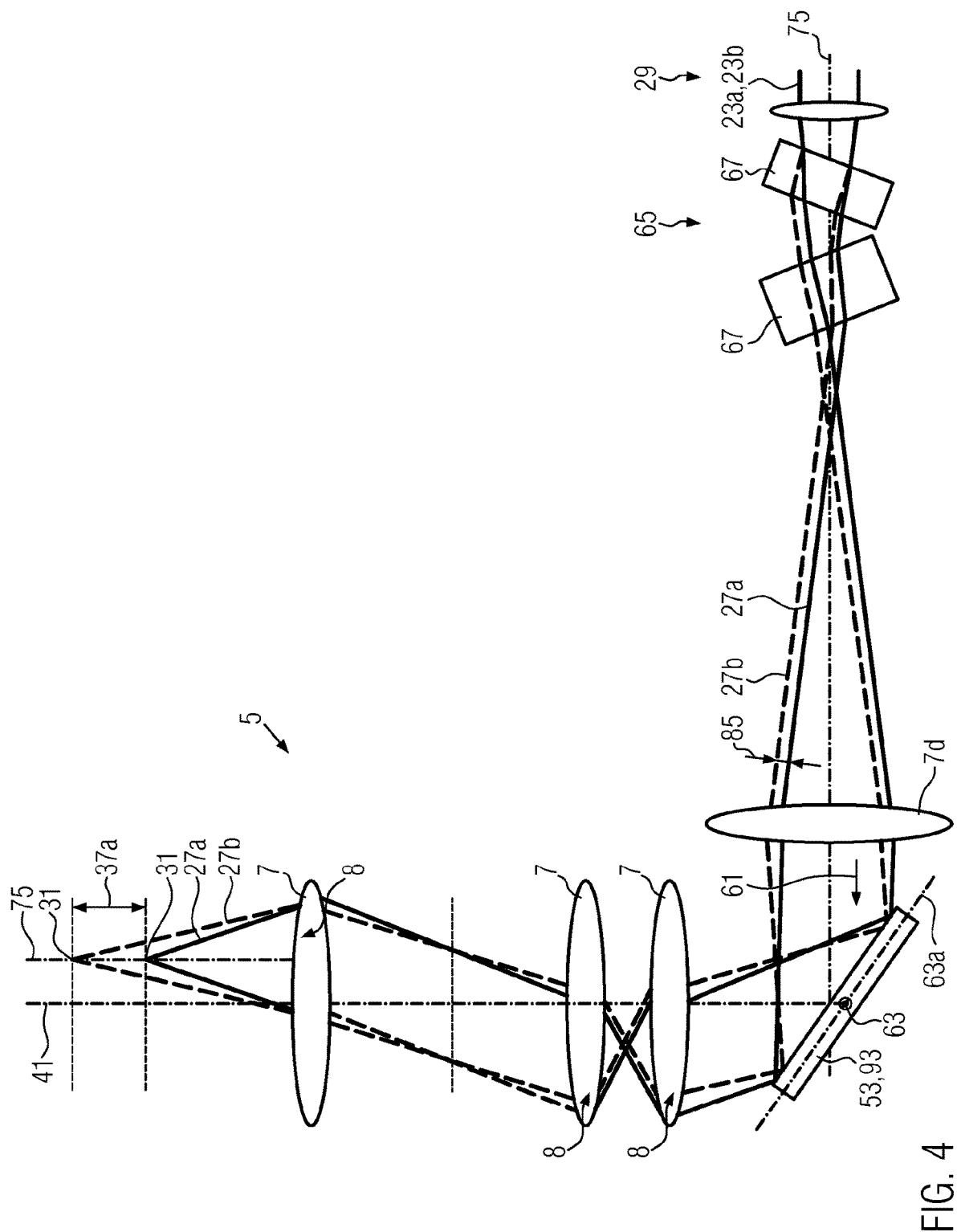
FIG. 4 illumination optics, with a lateral chromatic correction element introduced into the beam paths.

FIG. 4 shows illumination optics 5, with installed lateral chromatic correction system 65.

On the illumination side 29 of the illumination optics 5, the two beam paths 23a, 23b run collinearly and centrally to the original direction of propagation 75, and are focused by a focusing element 7e (shown here in the form of a lens 7d). The lateral chromatic correction system 65 is arranged between the focusing element 7e and occurring intermediate focus regions 31c. The lateral chromatic correction system 65 introduces a relative offset 85 of the blue light 27a to the red light 27b, as described above.

An absolute offset 85a is essentially compensated for by the two, oppositely-tilted, lateral chromatic correction elements 67. Downstream of the lateral chromatic correction elements 67, the two beam paths 23a, 23b run through a lens 7d, which results in a slight tilting of the beam paths relative to each other.

FIG. 4 also shows a deflection mirror 53 designed as a scanning mirror 93, which can be tilted about a scanning axis 63 emerging from the drawing plane, and about a scanning axis 63a located in the scanning mirror 93. With the scanning mirror 93 and its tilting, it is possible to vary the position of the focus regions 31 along a direction emerging from the drawing plane, or along a direction located in the drawing plane and extending orthogonally to the original direction of propagation 75.

In the illumination direction 61 which is deflected by the scanning mirror 93 and the subsequent lenses 7, the beam paths 23a, 23b are transmitted through said lenses 7 and focused in a wavelength-dependent focus region 31.

Since the illumination optics 5 have only one lateral chromatic correction system 65, the blue light 27a is focused at the same distance from the optical axis 41 as the red light 27b. An existing longitudinal chromatic aberration 37a is independent of the correction of the lateral chromatic aberration and continues to occur for this reason.

FIG. 4 also shows that the lenses 7 of the illumination optics 5 transmit the beam paths 23a, 23b in non-paraxial edge regions 8 through the corresponding lenses 7.

FIG. 5A shows a diffractive optical element 95, which is designed as a diffractive optical lens 97—in particular, as a tunable diffractive lens 99—which can be generated, for example, by means of a spatial light modulator 101.

When the two beam paths 23a, 23b which run coaxially to one another impinge on the tunable diffractive lens 99, the beam paths 23a, 23b are focused according to the setting of the tunable diffractive lens 99.

Since the diffractive optical element 95 is based upon diffraction effects, a focal length 103 of the blue light 27a is smaller than a focal length 105 of the red light 27b. The focal lengths 103, 105 are measured from a main plane 107 of the diffractive optical element 95 to the corresponding focus regions 31a, 31b.

FIG. 5B shows a refractive optical element 109, which is designed as a tunable lens system 111. The tunable lens system 111 comprises a concave lens 7c and a tunable convex lens 113.

In the setting shown in FIG. 5B, the tunable lens system 111 has the effect of a concave lens 7c, i.e., the coaxially-running beam paths 23a and 23b are not focused, so that a blue virtual focus region 115 (the virtual focal point of the blue light 27a) and a red virtual focus region 117 (the virtual focal point of the red light 27b) result.

The blue light 27a has the negative focal length 105, and the red light 27b has the negative focal length 103, wherein the magnitude of the focal length of the blue light 105 is smaller than the magnitude of the focal length of the red light 103 in the refractive optical element 109 shown.

Both the diffractive optical element 95 of FIG. 5A and the refractive optical element 109 of FIG. 5B change a convergence 119 (FIG. 5A) or a divergence 121 (FIG. 5B) of the beam paths 23a, 23b involved for both beam paths 23a, 23b, together as well as relative to each other, in a wavelength-dependent manner.

FIG. 5C shows a longitudinal chromatic correction system 123, comprising the tunable diffractive lens 99 of FIG. 5A and the tunable lens system 111 of FIG. 5B.

The longitudinal chromatic correction system 123 is shown in a first setting 125. In this first setting 125, the divergence 121 generated by the tunable lens system 111 is essentially compensated for by the convergence generated by the tunable diffractive lens 99. The longitudinal chromatic correction system 123 thus has a very long focal length (which may be in the range of several meters). In other words, the longitudinal chromatic correction system 123 essentially maintains the collimation of the transmitted beam paths 23a, 23b.

The pairing of a positive focal length of the tunable diffractive lens 99 and a negative focal length, having the same magnitude, of the tunable lens system 111 thus does not change the absolute convergence 119 or the absolute divergence 121 of the beam paths 23a, 23b.

However, by different pairings of the canceling focal lengths (+50 mm/−50 mm; +100 mm/−100 mm; etc.), a relative convergence or divergence difference 127 between the blue beam path 23a and the red beam path 23b can be adjusted.

FIG. 5D shows the longitudinal chromatic correction system 123 in a second setting 129. In the second setting 129, the absolute convergence 119 or the absolute divergence 121 of the beam paths 23a, 23b entering the longitudinal chromatic correction system 123 is also not changed and remains, essentially, zero.

However, the longitudinal chromatic correction system 123 has a relative convergence or divergence difference 127, which differs from the relative convergence or divergence difference 127 of the first setting of FIG. 5C.

In the first setting (FIG. 5C), the blue light 27a is essentially collimated, while the red light 27b has a convergence 121.

In the second setting 129, the red light 27b is essentially collimated, while the blue light 27a has a convergence 121.

FIGS. 6A and 6B show a second and third embodiment of the lateral chromatic correction system 65, wherein a prism 131 is used for generating the angular dispersion 81 in both embodiments.

The angular dispersion 81 is generated due to the material dispersion 33 of the prism 131, as previously described with reference to the example of the plane-parallel plate.

Depending upon the orientation of the prism 131 with respect to the original direction of propagation 75, an angular dispersion 81 of different magnitude can be generated.

Analogously to the deflection of the beam paths 23a, 23b back to the original direction of propagation 75 with the aid of deflection mirrors 53 shown in FIG. 3B, the beam paths 23a and 23b to which an angular dispersion 81 is applied in FIGS. 6A and 6B can be deflected back to the original direction of propagation. This can be comprehended with the aid of FIG. 3B.

In this case, the beam paths 23a, 23b are deflected in such a way that both beam paths 23a, 23b essentially no longer have any tilting relative to the original direction of propagation 75, but that there is still a relative tilting of the blue beam path 23a relative to the red beam path 23b.

An optical retrofit kit 150 may comprise one of the lateral chromatic correction systems 65 shown in FIGS. 3A, 3B, 6A, and 6B.

Likewise, the longitudinal chromatic correction system 123 shown in FIGS. 5C and 5D may be part of the optical retrofit kit 150.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| List of reference numbers | |
|---|---|
| 1 | Microscope |
| 2 | Light sheet microscope |
| 3 | Confocal microscope |
| 5 | Illumination optics |
| 7 | Lens |
| 7a | Biconvex lens |
| 7b | Viewing lens |
| 7c | Concave lens |
| 7d | Lens |
| 8 | Non-paraxial edge region |
| 9 | Further optical elements |
| 11 | Light source |
| 13 | Enlargement |
| 15 | Specimen holder |
| 15a | Specimen |
| 17 | Viewing optics |
| 17a | Microscope objective |
| 19 | Eyepiece |
| 21 | Refractive optical element |
| 23 | Beam path |
| 23a | Short-wave beam path |
| 23b | Long-wave beam path |
| 25 | Radiation beam |
| 27 | Wavelength |
| 27a | First wavelength |
| 27b | Second wavelength |
| 29 | Illumination side |
| 31 | Focus region |
| 31a | First focus region |
| 31b | Second focus region |
| 31c | Intermediate focus region |
| 33, 33a, 33b | Material dispersion |
| 35 | Lens material |
| 37 | Chromatic aberration |
| 37a | Longitudinal chromatic aberration |
| 37b | Lateral chromatic aberration |
| 39 | Lateral offset |
| 41 | Optical axis |
| 41a | Optical axis of viewing optics |
| 43 | Transverse offset |
| 45 | Central axis |
| 47 | Viewing plane |
| 47a | Further plane |
| 49 | Light spot |
| 51 | Deflection element |
| 53 | Deflection mirror |
| 55 | Bowl |
| 57 | Immersion liquid |
| 59 | Viewing direction |
| 61 | Illumination direction |
| 63, 63a | Scanning axis |
| 65 | Lateral chromatic correction system |
| 67 | Lateral chromatic correction element |
| 67a | First lateral chromatic correction element |
| 67b | Second lateral chromatic correction element |
| 68 | Plane-parallel plate |
| 69 | Thickness |
| 71 | Thickness |
| 73 | Clockwise direction |

| List of reference numbers | |
|---|---|
| 75 | Original direction of propagation |
| 75a | First direction of propagation |
| 75b | Second direction of propagation |
| 77a | First tilting angle |
| 77b | Second tilting angle |
| 79 | Counterclockwise direction of rotation |
| 81 | Angular dispersion |
| 83 | Specimen side |
| 84 | Specimen-side output |
| 85, 85b | Relative offset |
| 85a | Absolute offset |
| 87 | Deflection prism |
| 89 | Highly-dispersive, thin-film filter |
| 91 | Dispersive structure |
| 93 | Scanning mirror |
| 95 | Diffractive optical element |
| 97 | Diffractive optical lens |
| 99 | Tunable diffractive lens |
| 101 | Spatial light modulator |
| 103 | Blue-light focal length |
| 105 | Red-light focal length |
| 107 | Red virtual focus region |
| 109 | Divergence |
| 111 | Convergence |
| 113 | Longitudinal chromatic correction system |
| 115 | First setting |
| 117 | Relative convergence or divergence difference |
| 119 | Second setting |
| 121 | Prism |
| 123 | Motion transmission element |
| 125 | Stepper motor |
| 127 | Synchronization unit |
| 129 | Optical retrofit kit |
| 131 | Rotation angle |
| 133 | First mean deflection angle |
| 133a | Second mean deflection angle |
| 135 | Relative splitting |
| 150 | Direction of insertion |
| 151 | Prism base |
| 153a | Apex |
| 153b | Red virtual focus region |
| 155 | Divergence |
| 157 | Convergence |
| 159 | Longitudinal chromatic correction system |
| 161 | First setting |

The invention claimed is:

1. A light sheet microscope or a confocal microscope comprising:
illumination optics configured to transmit light of at least two wavelengths from at least one light source, along respective wavelength-dependent beam paths, from an illumination side of the illumination optics to a specimen side of the illumination optics; and
a lateral chromatic correction system comprising at least one optical lateral chromatic correction element, the at least one optical lateral chromatic correction element being configured such that the beam paths of the at least two different wavelengths have, at a specimen-side output of the lateral chromatic correction element, an offset parallel to each other and/or are inclined relative to each other in relation to the illumination side, which, on the specimen side of the illumination optics, results in an offset of the foci of the at least two wavelengths transverse to an optical axis of the illumination optics, wherein at least two optical lateral chromatic correction elements are provided, of which at least one optical lateral chromatic correction element is designed to be tiltable relative to the other lateral chromatic correction element.

2. The microscope according to claim 1, wherein the offset, caused on the specimen side of the illumination optics by the lateral chromatic correction element of the foci of the at least two wavelengths transverse to the optical axis of the illumination optics is opposite the offset, essentially caused by the illumination optics, of the foci transverse, relative to each other, to the optical axis of the illumination optics.

3. The microscope according to claim 1, wherein at least one of the at least two optical lateral chromatic correction elements is designed as a transmitting, substantially plane-parallel plate.

4. The microscope according to claim 1, wherein at least two of the at least two optical lateral chromatic correction elements are designed as transmitting, substantially plane-parallel plates, and wherein the at least two plane-parallel transmitting plates have a different refractive index and/or thickness from each other.

5. The microscope according to claim 1, wherein the at least two optical lateral chromatic correction elements have a different material dispersion from each other.

6. The microscope according to claim 1, wherein the at least two optical lateral chromatic correction elements are coupled to one another in a motion-transmitting manner.

7. The microscope according to claim 1, further comprising a longitudinal chromatic correction system configured such that the beam paths of the at least two different wavelengths on an illumination side of the longitudinal chromatic correction system have a divergence or convergence relative to each other, which differs from a divergence or convergence of the beam paths of the at least two wavelengths relative to each other on a specimen side of the longitudinal chromatic correction system.

8. The microscope according to claim 7, wherein the longitudinal chromatic correction system has at least one refractive optical element and at least one diffractive optical element.

9. The microscope according to claim 8, wherein the at least one refractive optical element and/or the at least one diffractive optical element have a variably-adjustable focal length.

10. The microscope according to claim 8, wherein the at least one diffractive optical element is designed as a spatial light modulator.

11. The microscope according to claim 1, wherein the beam paths of the at least two wavelengths extend in non-paraxial edge regions of the illumination optics, and wherein at least one deflection mirror deflecting the beam paths by, essentially, 90° is provided on the specimen side of the illumination optics.

12. An optical retrofit kit for a light sheet microscope or a confocal microscope which has illumination optics for transmitting light of at least two wavelengths from at least one light source, along respective wavelength-dependent beam paths, from an illumination side of the illumination optics to a specimen side of the illumination optics, the optical retrofit kit comprising:
a lateral chromatic correction system comprising at least one optical lateral chromatic correction element, the at least one optical lateral chromatic correction element being configured such that the beam paths of the at least two different wavelengths have, at a specimen-side output of the lateral chromatic correction elements, an offset parallel to each other and/or are inclined relative to each other in relation to the illumination side, which, on the specimen side of the illumination optics, results in an offset of the foci of the at least two wavelengths transverse to an optical axis of the illumination optics, wherein at least two optical lateral chromatic correction elements are provided, of which at least one optical lateral chromatic correction element is designed to be tiltable relative to the other lateral chromatic correction element.

13. The optical retrofit kit according to claim 12, wherein the offset, caused on the specimen side of the illumination optics by the lateral chromatic correction element, of the foci of the at least two wavelengths transverse to the optical axis of the illumination optics is opposite the offset, essentially caused by the illumination optics, of the foci transverse, relative to each other, to the optical axis of the illumination optics.

14. The optical retrofit kit according to claim 12, further comprising a longitudinal chromatic correction system configured such that the beam paths of the at least two different wavelengths on an illumination side of the longitudinal chromatic correction system have a divergence or convergence relative to each other, which differs from a divergence or convergence of the beam paths of the at least two wavelengths relative to each other on a specimen side of the longitudinal chromatic correction system.

15. A light sheet microscope or a confocal microscope comprising:

illumination optics configured to transmit light of at least two wavelengths from at least one light source, along respective wavelength-dependent beam paths, from an illumination side of the illumination optics to a specimen side of the illumination optics; and a lateral chromatic correction system comprising at least one optical lateral chromatic correction element, the at least one optical lateral chromatic correction element being configured such that the beam paths of the at least two different wavelengths have, at a specimen-side output of the lateral chromatic correction element, an offset parallel to each other and/or are inclined relative to each other in relation to the illumination side, which, on the specimen side of the illumination optics, results in an offset of the foci of the at least two wavelengths transverse to an optical axis of the illumination optics, and a longitudinal chromatic correction system configured such that the beam paths of the at least two different wavelengths on an illumination side of the longitudinal chromatic correction system have a divergence or convergence relative to each other, which differs from a divergence or convergence of the beam paths of the at least two wavelengths relative to each other on a specimen side of the longitudinal chromatic correction system.

* * * * *